(12) United States Patent
Kean

(10) Patent No.: US 10,262,411 B2
(45) Date of Patent: Apr. 16, 2019

(54) SITE SCANNING USING A WORK MACHINE WITH A CAMERA

(71) Applicant: Deere & Company, Moline, IL (US)

(72) Inventor: Michael G. Kean, Maquoketa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/693,818

(22) Filed: Sep. 1, 2017

(65) Prior Publication Data
US 2019/0073762 A1  Mar. 7, 2019

(51) Int. Cl.
*G06K 9/00* (2006.01)
*G05D 1/00* (2006.01)
(Continued)

(52) U.S. Cl.
CPC ............ *G06T 7/0008* (2013.01); *E02F 9/261* (2013.01); *G01B 11/30* (2013.01); *G01C 21/28* (2013.01); *G01C 21/3602* (2013.01); *G01C 21/3676* (2013.01); *G01S 19/47* (2013.01); *G06T 7/62* (2017.01); *H04N 13/254* (2018.05); *H04N 13/271* (2018.05); *G06T 7/593* (2017.01); *G06T 2207/10028* (2013.01); *G06T 2207/20228* (2013.01); *G06T 2207/30252* (2013.01)

(58) Field of Classification Search
USPC ....... 382/100, 103, 106–108, 154, 162, 168, 382/173, 181, 199, 219, 232, 254, 274, 382/276, 286–294, 305, 312; 701/1, 2; 172/4.5; 73/23.2
See application file for complete search history.

(56) References Cited

U.S. PATENT DOCUMENTS

| 7,865,285 B2 * | 1/2011 | Price | E02F 3/434 |
| | | | 172/4.5 |
| 2010/0106344 A1 * | 4/2010 | Edwards | E02F 9/205 |
| | | | 701/2 |

(Continued)

FOREIGN PATENT DOCUMENTS

JP          H1088625 A          4/1998

OTHER PUBLICATIONS

Mandapat, Rommel E., "Development and Evaluation of Positioning Systems for Autonomous Vehicle Navigation", A Thesis presented to the Graduate School of the University of Florida in Partial Fulfillment of the Requirements for the Degree of Master of Science, 2001.

(Continued)

*Primary Examiner* — Seyed H Azarian
(74) *Attorney, Agent, or Firm* — Taft Stettinius & Hollister LLP; Stephen F. Rost

(57) ABSTRACT

A method of detecting a defect in a surface of an infrastructure includes providing a work machine having a controller, a plurality of sensors including an inertial measurement unit (IMU) and a global positioning sensor (GPS), and a camera oriented in a direction substantially perpendicular to the surface. The camera takes a first image of the surface at a first location, and information is collected with the IMU and the GPS at the first location. The method includes linking the first image with the information collected at the first location, and storing the first image and the information collected at the first location in a database.

18 Claims, 7 Drawing Sheets

(51) Int. Cl.
*G06T 7/00* (2017.01)
*G01B 11/30* (2006.01)
*G01S 19/47* (2010.01)
*G06T 7/62* (2017.01)
*E02F 9/26* (2006.01)
*G01C 21/36* (2006.01)
*G01C 21/28* (2006.01)
*H04N 13/254* (2018.01)
*H04N 13/271* (2018.01)
*G06T 7/593* (2017.01)

(56) References Cited

U.S. PATENT DOCUMENTS

2012/0166019 A1* 6/2012 Anderson ............ G05D 1/0219
 701/1
2012/0277932 A1* 11/2012 Anderson .............. G06N 5/043
 701/2
2015/0153312 A1* 6/2015 Gonzalez ................. G01D 5/00
 73/23.2
2018/0073208 A1 3/2018 Wilson et al.

OTHER PUBLICATIONS

German Search Report, German Patent and Trademark Office, German Patent Application Ser. No. 102018207706.1, dated Jan. 23, 2019, pp. 1-10.

* cited by examiner

SITE SCANNING USING A WORK MACHINE WITH A CAMERA

FIELD OF THE DISCLOSURE

The present disclosure relates to a work machine, and in particular, to a method of performing site scanning with a work machine having a camera.

BACKGROUND

Construction machines, such as a motor grader, may be used to compact a surface. Other work machines may be used to fix roads that have potholes, cracks or other defects. Conventional processes for fixing roads is reactive, i.e., a pothole or crack is detected, and then it is later fixed. This is largely due to conventional equipment in the field and its limitations.

In accordance with the present disclosure, a system and method is provided for overcoming the obstacles of conventional equipment. In doing so, one or more embodiments may be provided for selectively scanning a site or location where a work operation, maintenance, or repair operation may be performed or required in advance of the actual work being performed.

SUMMARY

In one embodiment of the present disclosure, a work machine for traversing a surface to detect defects therein, includes a chassis; a plurality of ground-engaging mechanisms coupled to and supporting the chassis; a controller for controlling the machine; a plurality of sensors coupled to the chassis, the plurality of sensors comprising at least an inertial measurement unit (IMU) and a global positioning sensor electrically coupled to the controller; a camera coupled to the chassis and oriented in a direction substantially perpendicular to the surface, the camera configured to take a plurality of images of the surface as the machine travels therealong; a database disposed in electrical communication with the controller, the database configured to receive images and data associated with each image; wherein, as the work machine travels along the surface, the camera takes a first image and a second image, and the controller receives a first set of data when the first image is taken and a second set of data when the second image is taken, where each set of data includes a location, velocity, and orientation of the machine; further wherein, the first image, the first set of data, the second image, and the second set of data are transmitted to the database for detecting a defect in the surface.

In one example of this embodiment, at least a second camera is coupled to the chassis and oriented substantially perpendicular to the surface, the cameras spaced from one another by a predefined distance. In a second example, the controller operably links the first image with the first set of data and the surface roughness at the first location, and operably links the second image with the second set of data and the surface roughness at the second location. In a third example, at least one light source is coupled to the chassis and oriented to project light on the surface where the camera takes the plurality of images.

In another embodiment of the present disclosure, a method of detecting a defect in a surface of an infrastructure includes providing a work machine having a controller, a plurality of sensors including an inertial measurement unit (IMU) and a global positioning sensor (GPS), and a camera oriented in a direction substantially perpendicular to the surface; providing a database disposed in electrical communication with the controller; taking a first image with the camera of the surface at a first location; collecting information with the IMU and the GPS at the first location, the information including at least a position, velocity, and an orientation of the work machine; linking the first image with the information collected at the first location; and storing the first image and the information collected at the first location in the database.

In one example of this embodiment, the method includes measuring a surface roughness of the surface with the IMU at the first location. In a second example, the method includes determining with the IMU a confidence level associated with the first image and transmitting the confidence level to the controller. In a third example, the method includes rejecting the image if the confidence level is below a threshold value. In a fourth example, the method includes controlling the work machine to return to the first location and taking another image to replace the first image after the rejecting step. In a fifth example, the method includes controlling the work machine to a second location of the surface; taking a second image of the surface with the camera at the second location; collecting information with the IMU and the GPS at the second location, the information including at least a position, velocity, and an orientation of the work machine; linking the second image with the information collected at the second location; and storing the second image and the information collected at the second location in the database.

In a sixth example of this embodiment, the method includes determining if there is overlap between the first image and the second image; rejecting the second image if there is no overlap; and generating a disparity map between the first image and the second image if there is overlap. In a seventh example, the method may include producing point cloud data based on the disparity map; projecting the point cloud data onto a surface grid formed from baseline data associated with a non-defective surface; determining a difference between the point cloud data and the surface grid; and detecting a defect in the surface based on the difference. In an eighth example, the method includes determining gridded and stitched surface data from the first location and the second location of the surface; determining if there is a surface change between each grid point formed in the two sets of data; and performing a corrective action if the surface change is indicative of a defect in the surface.

In a ninth example of this embodiment, the determining if there is a surface change step includes performing a logical test based on a differential volume or shape change. In a tenth example, the method includes comparing the surface change to a threshold; and transmitting an alert indicative of a defect in the surface requiring repair. In an eleventh example, the comparing step includes comparing the surface change to a first threshold to detect if a difference therebetween requires corrective action; and comparing the difference to a second threshold to determine the type of corrective action required to repair the defect. In a further example, the performing step includes producing a corrected design file for repairing a defect in the surface; and transmitting the corrected design file to a third party for scheduling the repair or performing the repair upon receipt.

In a further embodiment of this disclosure, a method for producing a path of travel of a work machine for maintaining compaction of a road surface includes providing a work machine having a controller, a plurality of sensors including an inertial measurement unit (IMU) and a global positioning sensor (GPS), and a camera oriented in a direction substantially perpendicular to the surface; providing a database disposed in electrical communication with the controller; taking a first image with the camera of the surface at a first location and a second image of the surface at a second location; collecting a first set of data with the IMU and the GPS at the first location and a second set of data at the second location, each set of data including at least a position, velocity, and an orientation of the work machine; linking the first image with the information collected at the first location and the second image with the information collected at the second location; storing the first image and the information collected at the first location in the database; generating a disparity map from the first image, the second image, and the information collected at the first and second locations; producing a first gridded and stitched surface data based on the first image and the first set of data, and a second gridded and stitched surface data based on the second image and the second set of data; calculating compaction between the surface at the first location and the surface at the second location; and producing a path of travel to achieve desired compaction of the surface at and between the first and second locations.

In one example of this embodiment, the method includes producing a compaction map based on a result of the calculating compaction step. In another example, the method includes generating an overlay of the surface with the path of travel; and displaying the compaction map with the path of travel on a display screen in a cab of the work machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
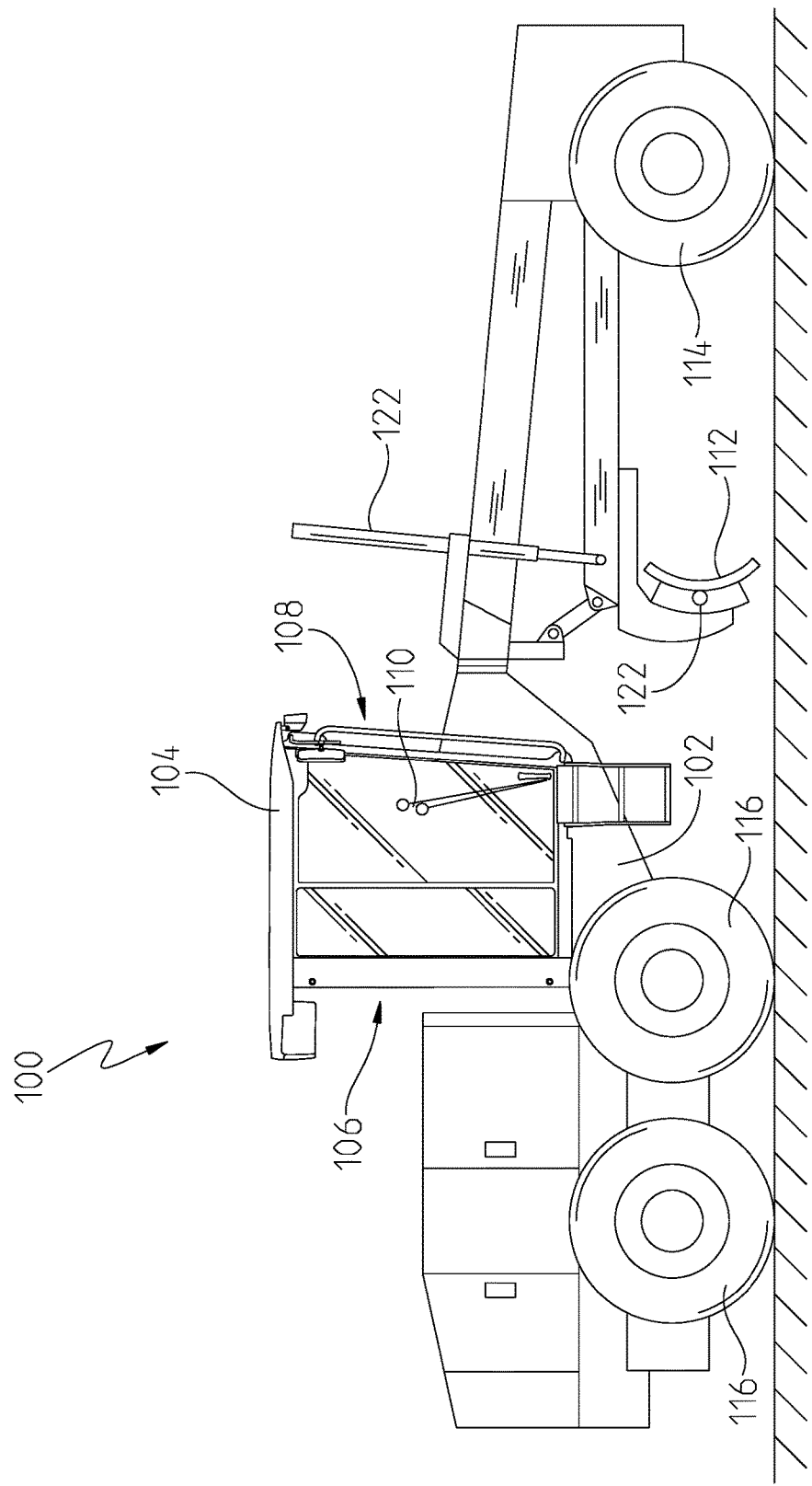
FIG. 1 is a side view of a work machine such as a motor grader.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, a work machine 100 is shown. In one embodiment, the work machine 100 may be a motor grader. However, this disclosure is not limited to such a machine. Rather, the teachings of this disclosure may be applicable to any work machine including, but not limited to, an excavator, tractor, dump truck, etc. Moreover, the work machine may be any agricultural, construction, forestry, industrial, automated, semi-automated, manual, or other type of machine or vehicle.

The work machine 100 in FIG. 1 includes a chassis 102 or frame coupled to a front set of wheels 114 and a rear set of wheels 116. Although the machine 100 includes wheels in this illustrated embodiment, other types of machines may include tracks or other known ground-engaging mechanisms. Also coupled to the chassis 102 may be a cabin 104 that has a back portion 106 and a front portion 108. The cabin 104 may also define an interior region where a user or operator may control the work machine 100 with a plurality of controls 110.

In one aspect of the present disclosure, the plurality of controls may be manipulated by the user or operator to control the location of an implement 112 such as a blade or moldboard. Other implements may include a blade, knives or other cutting tool, bucket, etc. The plurality of controls 110 may include switches, levers, push buttons, joy sticks, steering wheel, turn dials, or any other known control mechanism. In the illustrated embodiment of FIG. 1, the implement 112 may be repositionable relative to the work machine through a plurality of actuators 122 coupled between the implement 112 and the chassis 102. However, this disclosure is not limited to such an embodiment. This disclosure is equally applicable to any type of implement that may be part of a work machine and require control by the user.

Figure 2:
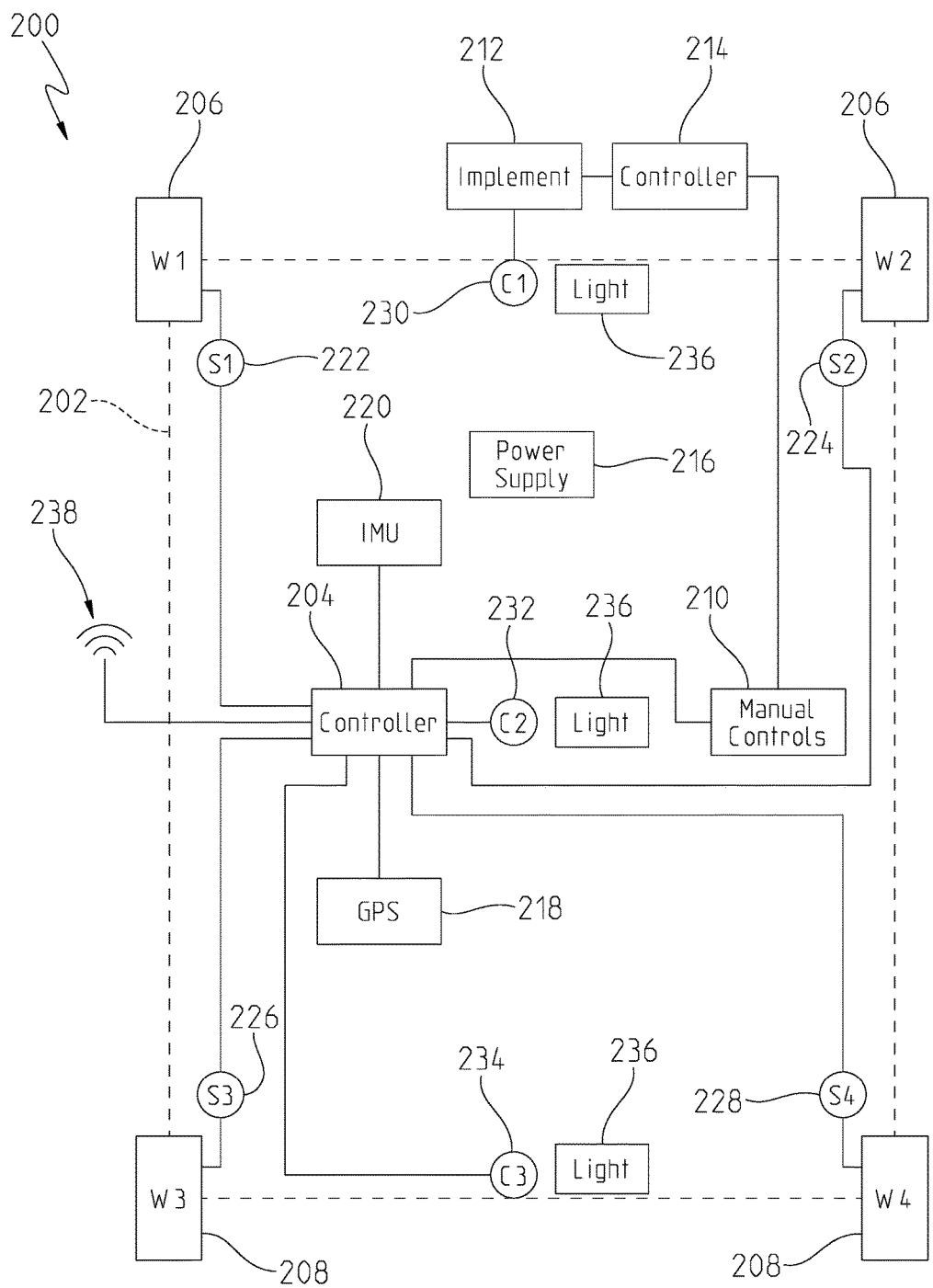
FIG. 2 is a partial control system of a work machine.

Referring now to FIG. 2, an embodiment of a control system 200 is shown for a work machine or vehicle. The system 200 may include a work machine 202 having a frame or chassis supported by a front pair of ground-engaging mechanisms 206 and a rear pair of ground-engaging mechanisms 208. The ground-engaging mechanisms may include wheels, tracks, or any other known type of ground-engaging mechanism.

A controller 204, such as a vehicle controller, may operably control the work machine 202 and its operation. The controller 204 may include a plurality of inputs and outputs for receiving and transmitting data and information. As shown, the controller 204 may communicate wirelessly via a wireless communication network 238 such as via Wi-Fi. The controller 204 may also communicate via wired communication lines (not shown). In addition, the controller 204 may include a memory unit capable of storing one or more algorithms, programs, a set of instructions, etc. in order to execute a control process. A processor of the controller 204 may execute the control process for performing a desired function.

The work machine 202 or vehicle may include a cab or operator's station (not shown) with operator controls 210 for controlling the machine. The operator controls 210 may be in communication with the controller 204 as shown. The operator may desire to operate and control a work implement 212. The work implement 212 may be a bucket, blade, bucket, sprayer, knives, or any other type of implement. An implement controller 214 may be optionally provided for controlling the implement 212. The implement controller 214 may be in communication with the operator controls 210, and in at least some cases, to the main controller 204.

The work machine 202 may also include a power system 216 capable of producing power to propel the machine in a desired direction. The power system 216 may include an engine, transmission, or any other type of power system component. The power system 216 may further be in communication with the controller 204. Alternatively, the power system 216 may include its own controller such as an engine control module, transmission control module, etc. In any event, the power system 216 may communicate with the controller 204 over a communication link such as a controller area network ("CAN") bus. Other communication links are possible as well.

The controller 204 may be electrically coupled to a plurality of sensors. For example, in FIG. 2, the controller 204 is in communication with a global positioning sensor 218 that may be used for navigation of the work machine. An inertial measurement unit 220, or IMU, may also be in electrical communication with the controller 204. The IMU 220 may use a combination of accelerometers and gyroscopes in order to determine inertia data of the machine or vehicle. Other sensors may include speed sensors such as those shown in FIG. 2. A first speed sensor 222 and a second speed sensor 224 may detect the rotational speed of the front pair of ground-engaging mechanisms 206. A third speed sensor 226 and a fourth speed sensor 228 may detect the rotational speed of the rear pair of ground-engaging mechanisms 208. Each speed sensor may be electrically coupled to the controller 204 to communicate the speed of each ground-engaging mechanism. Other speed sensors may be provided as well, such as for detecting the vehicle speed. The embodiment of FIG. 2 may include additional sensors beyond what is shown, and thus FIG. 2 is not intended to limit the scope of this disclosure.

The illustrated embodiment of FIG. 2 represents a work machine, vehicle, or robot capable of performing site scanning of infrastructure such as a road, bridge, building, cable, etc. Conventional scanning of infrastructure damage or deterioration has been done via aerial topography scanning. This means of scanning requires significant energy resources and is unable to perform quality scanning of infrastructure, particularly if small cracks or fraying of wire or cable is developing. In other words, there is a greater need for a machine or robot capable of performing a slower continuous scanning process to better capture deterioration or defects developing in infrastructure. A work machine, vehicle or robot having one or more ground-engaging mechanisms is able to support itself as it moves along a surface, which is advantageous over conventional aerial topography mapping processes.

To overcome the limitations of aerial topography, the working machine 202 of FIG. 2 may include one or more inertial sensors (e.g., IMUs) which are capable of both surface quality sensing and providing visual images of defects in the surface or infrastructure. The images may be taken by one or more cameras coupled to the work machine. In FIG. 2, a first camera 230 is disposed towards the front of the machine between the pair of front ground-engaging mechanisms 206. A second camera 232 is positioned near the middle of the machine 202, and a third camera 234 is positioned towards the rear of the machine between the pair of rear ground-engaging mechanisms 208. Although three cameras are illustrated in the embodiment of FIG. 2, it is possible only a single camera is used in other embodiments. Moreover, any number of cameras may be used and coupled to the work machine for scanning an infrastructure structure.

As also shown, lights 236 may be also coupled near the cameras to project light on the scanned surface to improve the quality of images taken. Any type of light may be used, and while three lights are shown in FIG. 2, there may be any number of lights coupled on the machine.

With the camera or cameras in place, each may be oriented to be perpendicular with respect to the infrastructure surface. As images are taken by the camera(s), surface roughness measurements taken by the inertial sensors located on the machine may be linked with the images taken over time. This will be further described below.

Figure 3:
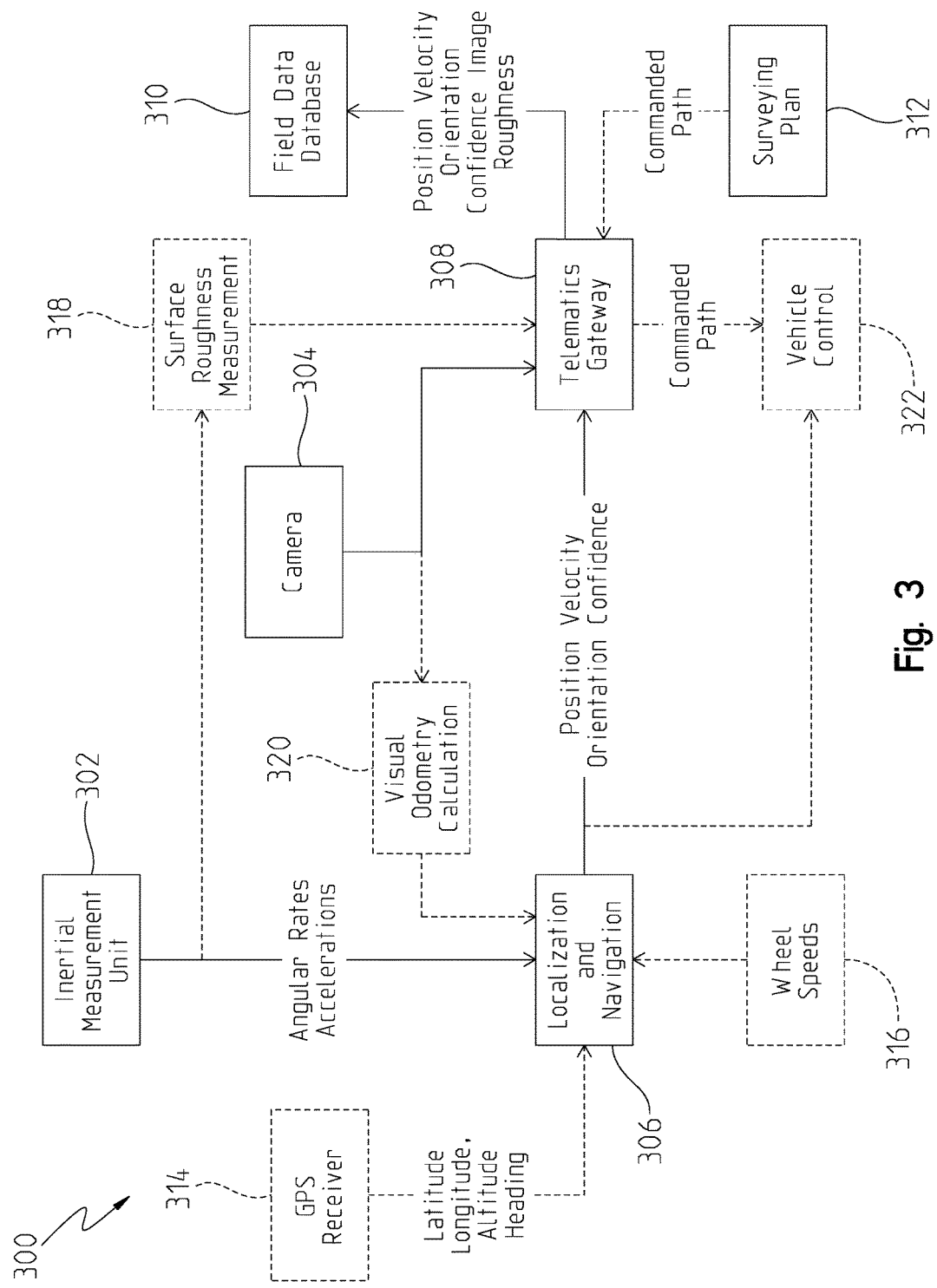
FIG. 3 is a schematic of a data collection system on a work machine.

Referring to FIG. 3, an example of a data collection system is shown. Here, not all features identified in FIG. 2 are shown. Instead, the data collection system 300 may include sensors such as at least one inertial measurement unit (IMU) 302, a camera 304, a GPS receiver 314, and wheel or ground-engaging mechanism sensors 316. Each of these sensors may communicate with a controller for performing one or more functions. The data collection system may further include a telematics gateway 308 such as the Modular Telematics Gateway 4G (MTG 4G LTE) introduced by John Deere Electronic Solutions. The MTG 4G LTE is a mobile communications and processing platform suited for advanced telematics applications such as machine health monitoring, advanced logistics, machine control, over the air programming, and remote diagnostics.

As previously described, the IMU 302 may provide angular rates and accelerations, and the GPS receiver 314 may provide a location or position of the machine including its current latitude, longitude, altitude and heading. Based on the angular rates and accelerations from the IMU 302 and the latitude, longitude, altitude, and heading from the GPS receiver 314, a controller (e.g., controller 204) is able to perform a localization and navigation routine 306. In some instances, the GPS receiver is an optional feature and localization and navigation may be performed without the receiver. For instance, the IMU 302 may be used to determine location, orientation and a confidence level in that these measurements are accurate. In another embodiment, the system 300 may include additional information for navigation or localization including GPS, odometry, and visual odometry. A visual odometry calculation 320, for example, may be performed by the controller as part of the system 300. The optional components may form part of the localization and navigation routine 306 of FIG. 3, which may further increase the confidence of the navigation data compared to that determined solely by the IMU 302.

The IMU 302 may also perform a surface roughness measurement 318 as shown in FIG. 3. The IMU 302 may detect peak acceleration, average acceleration, standard deviation of acceleration, power spectral density (PSD) of acceleration, and the like which may be used to determine when an infrastructure surface needs repair. Moreover, this information may further be used by the controller to compare with images taken by the camera 304 to verify whether the images are valid. The height of the camera from the surface may either be determined or known based on how it is coupled to the machine or robot. In any event, the camera 304 may take images which are then linked by the controller to the measurement data detected by the IMU and other sensors. The images and data may be further transmitted wirelessly by the telematics gateway or other controller to a database 310 that stores field data. The database 310 may be located on the machine, or in other instances it may be located remotely.

The control system 300 of FIG. 3 uses the IMU 302 and camera 304 to perform a site scanning process. In some instances, a predefined path may be set forth for the machine to follow. In some instances, the machine is an autonomous robot that is controlled to survey or scan portions of infrastructure such as a road or bridge. Sensors, including the IMU 302, are used to determine the path in some instances. A control module may be used to monitor the environment and control how the machine will follow or track along the infrastructure.

On a non-predefined path, the system 300 includes sensors and other intelligence for self-navigation if the machine does not follow a GPS path (i.e., GPS coordinates to maintain the vehicle on a road). The system further includes the IMU and other sensors for locating the machine and coordinating or linking the location to images taken by the camera 304. As such, if there are two or more cameras 304, it may be necessary to determine or know the distance between cameras, the height of or distance the cameras are from the underlying surface, how frequently the scans or images are taken (i.e., the separation between images), how much overlap exists between consecutively taken images, and when the images are taken.

A surveying plan 312 may further be provided as part of the system 300. The surveying plan 312 may communicate a commanded path or predefined path to the telematics gateway 308 or controller to control movement of the machine. This achieves at least part of a vehicle control 322 as shown in FIG. 3. The machine may be controlled manually by a machine operator, or as described herein, controlled using the navigation data.

Figure 4:
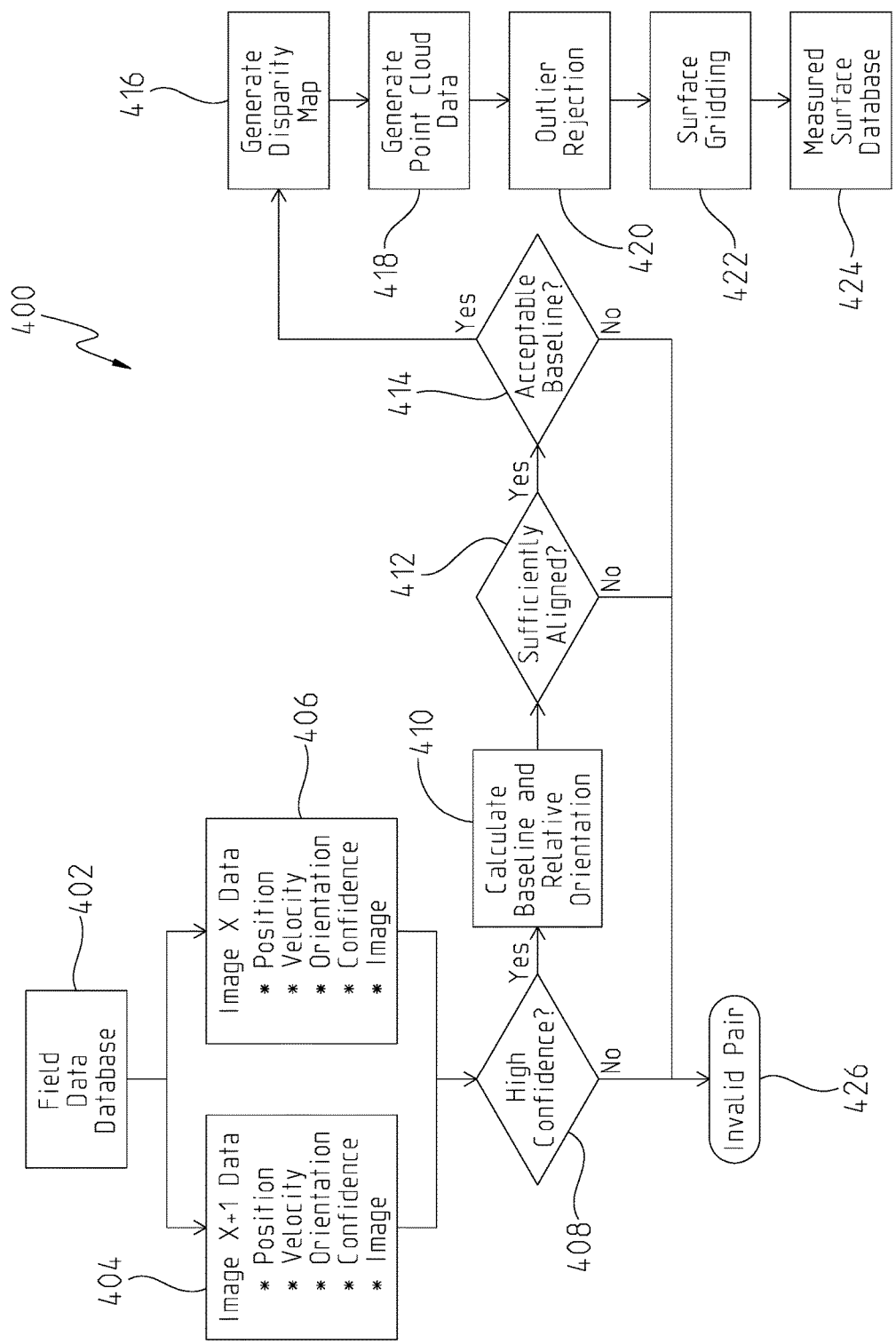
FIG. 4 is a flow diagram of a method of processing consecutive images using a stereo imaging camera on a work machine.

In FIG. 4, one embodiment of a control process is illustrated for extracting point cloud data from the field data collected and stored in the field data database 310. This control process may be performed on the work machine, or alternatively it may be executed remote from the machine. In any event, the field data database may include a plurality of images taken during the scanning process and stored in the database 310. In FIG. 4, a first image data 404 and a second image data 406 may be compared to one another. Each image data may include information such as a position of the robot or machine at the time the image was taken, the velocity of the robot or machine at this time, the orientation of the robot or machine, a confidence level of the information contained in the image data as determined by the IMU 302 or localization and navigation unit 306, and the actual image taken.

In this process, consecutive images are compared to one another and thus in FIG. 4 the image data, X, is compared with image data, X+1. The control process may include one or more blocks or steps performed by a controller or other control means for extracting point cloud data. The position and orientation of the robot or work machine relative to when an image is taken at both points in time is used in order to fuse or link the images together to obtain a point cloud. To do so and in a first block, the controller or control means may first determine if the confidence level in the two data images is high. This may include comparing the confidence level of both sets of data to a threshold confidence level. If the confidence level is low and does not satisfy the threshold, the control process may advance to block 426 where it is determined the data is invalid or corrupt.

In one example of this process, the field data database 402 or vision processing algorithm that may be used to execute the control process may have the ability to perform minor corrections on image data, or in some instances, reject image data when information such as position, orientation, and velocity is unknown. For example, if the robot or machine encounters a bump on the road, this may affect the image data such that confidence level is low. In another example, a controller (e.g., controller 204) tracks robot position and its orientation, and a confidence filter may be used to provide a confidence level in position and orientation. In some instances, particularly when some of the control process such as block 408 is performed on the robot or machine and the confidence level for a given image is low, the machine or robot may back up and retake the image.

If the confidence level satisfies the threshold in block 408, the control process advances to block 410 where a baseline orientation and relative orientation of the machine or robot are calculated. These calculations are then compared and in block 412 it is determined whether the images are sufficiently aligned. In other words, a determination is made in this block whether the images are close enough to one another, i.e., is there overlap between images, in order to link the images to the other data. If not, the control process advances to block 426 due to an invalid pair of images. If so, the control process may advance to block 414 where a determination is made whether an acceptable baseline is established. If the baseline is acceptable in block 414, the control process may advance to block 416 where a disparity map is generated. If not, then the process advances to block 426 as described above.

For a stereo vision control process such as the one depicted in FIG. 4, the one or more cameras 304 take the images in order to generate an overlap. The images may be overlaid in block 416, and the distance apart may be used to determine a depth of each pixel. The controller or a server (i.e., control means) may sort through the images. If something is close to the camera, this may be detected by a smaller distance, whereas something further from the camera may detect a different depth of the pixel. In any event, once the images, X and X+1, are overlaid, the processor of the controller or server may create the disparity map in block 416. The disparity map in block 416 may be used to provide depth information and generate point cloud data in block 418. In block 420, outlier filtering may be used to remove data that lacks quality. The better quality data may be compared to nominal data or the previous image data to detect possible defects in the infrastructure.

Surface gridding may be performed in block 422 according to known processes, and measured surface data may be compared to a designed or nominal surface data. This data may be stored in a measured surface database in block 424. With the new point cloud data generated based on new image data, the point cloud data may be projected onto a surface grid in block 422. In doing so, distances between the new point cloud data and nominal grid data may be compared. The distances between the two grids, i.e., XYZ coordinates of measured point cloud data compared to XYZ coordinates of nominal surfaces, is used to detect possible defects.

Figure 5:
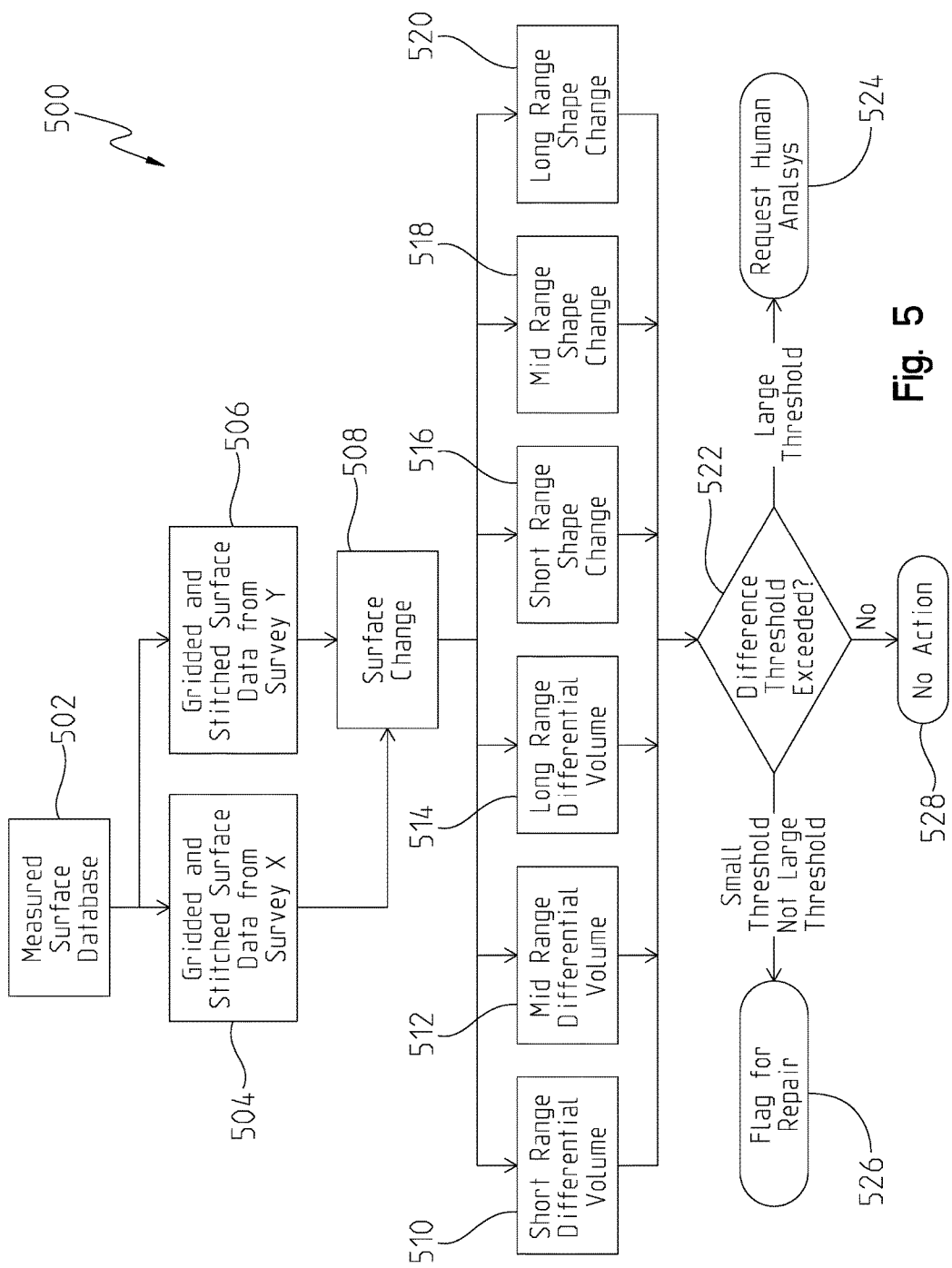
FIG. 5 is a flow diagram of one embodiment of a method of performing a comparison performed on a stitched and gridded surface.

Referring to FIG. 5, a different control process is illustrated. Here, the control process 500 uses the data collected in the measured surface database 424 from FIG. 4 and performs a comparison on stitched and gridded surfaces. This process may be performed well on a road surface or other uniformly traversed surface, for example. To start with, a processor or server or other control means obtains information from the measured surface database in a first block or step 502. The information may include gridded and stitched surface data from a first survey, X, in block 504 and from a second survey, Y, in block 506. The surface change between the two sets of surface data is performed in block 508. For each grid point in space, the surfaces are compared to determine a height change or difference between the pair of surveying runs. In some instances, one of the two surveying runs may be reference data to which the other survey data is compared.

The comparison block or step passes through one or more logical tests to determine whether the surfaces are sufficiently different that some form of corrective action needs to be performed. One set of logical tests integrates the volume between the surfaces. This is shown in blocks 510, 512, and 514. These logical tests may be used for instances where the entire surface is expected to move in space as one unit as it wears. For example, this may be the case due to compaction on a uniformly traversed surface or when a grader or crawler has graded a surface and removed a desired depth of material. In the illustrated embodiment of FIG. 5, a short range differential volume test is performed in block 510, a mid-range differential volume test is performed in block 512, and a large range differential volume test is performed in block 514. Each of these tests may be executed independently or mutually exclusive of one another. Alternatively, each of these tests may be executed together. The difference between the tests may be the size of surface that was scanned by the machine and amount of data collected and stored in the database for a given survey.

A second test or set of tests is shown in blocks 516, 518, and 520. In these blocks, logical tests are executed to compare the change in shape of the scanned surface. This may be useful when looking at potholes, cracks due to roots or expansion of concrete, tire ruts in dirt roads, or other similar instances. Here, the defect or change in shape is formed in a smaller area of the road or surveyed surface, unlike the change in the entire surface which was described above. Similar to the previous logical tests which detected change in volume, the change in shape logical tests of blocks 516, 518, and 520 may be performed over large areas and distances or small areas and distances.

In each of blocks 510-520, a threshold value may be predefined for each given logical test. For instance, the threshold value stored in block 510 may be different from the threshold value stored in block 512 based on the size of area or distance of the surveyed data. The same may be true of the other blocks 514, 516, 518, and 520. In any event, the surface change data collected in block 508 may be compared to the appropriate differential volume threshold in block 510, 512, or 514, or to the appropriate shape change threshold in block 516, 518, or 520. If the surface change does not exceed the threshold as determined in block 522, then the control process 500 advances to block 528 and no action is taken.

On the other hand, if the surface change does exceed the threshold in block 522, a determination is made whether the difference between the surface change and the threshold is small or large. This may be a separate determination to detect whether the difference between the surface change and the threshold is greater than a threshold percentage (e.g., 5% or 10%). If the difference is less than the threshold percentage, then an alert or flag may be triggered in block 526 based on which logical test failed. In the event the difference is greater than the threshold percentage, then the database may flag that portion of the surface for inspection in block 524. The relevant images from the two surfaces may also be flagged as necessary. As a result, this enables the system to be robust enough to unexpected surface features by requesting human analysis as appropriate. For instance, if there is roadkill or leaves on the road surface, the system may be able to detect a change in shape of the surface but unable to determine what the change in shape is a result of, and thus human analysis may be requested for further inspection.

Similar to FIG. 5, an autonomous robot or machine may be used to track or scan a surface on a road, building or bridge. If an autonomous robot is used, the robot may include additional features to allow it to climb along a surface of a building or bridge to scan for cracks or other defects. In some instances, the robot may be used to scan cables or wiring to detect frayed wire on the cable. In other instances, the robot may detect a missing rivet or peeling paint. The robot may include a database that stores a nominal or reference data for a given surface. For instance, a normal surface may be stored and classified as such in the database. The reference data may be specific to the type of surface being scanned (i.e., road surface, bridge, etc.). The robot may include a database or processor with an algorithm capable for using data from a scan and images taken from cameras in order to determine whether a defect exists. The surface change algorithm of FIG. 5, for example, may be performed by the autonomous robot as it moves along the surface it is scanning.

The robot may also be capable of tracking the infrastructure, categorizing defects as it performs the scanning operation, and further detects or categorizes the severity of the defects. With this data, a database of information is created to help track where maintenance or repair is necessary and how urgent of a need exists to perform the maintenance or repair. If the need is urgent and the defect is severe, the robot may include a wireless communication capability to transmit an alert to a remote location (e.g., a county grader operator) of the infrastructure and type of repair needed. This may be the case if a severe crack or pothole is detected on a county road, for example, and the robot immediately alerts the county grader operator of the defect. Moreover, if the reference road surface is stored on the robot, a three-dimensional (3D) design file may be established for an autonomous or grade control grader so the operator can perform the scan, detect the defect in the surface, and immediately knows how to correct or fix the defect. In some instances, the robot may be a work machine that is capable of performing the fix.

Figure 6:
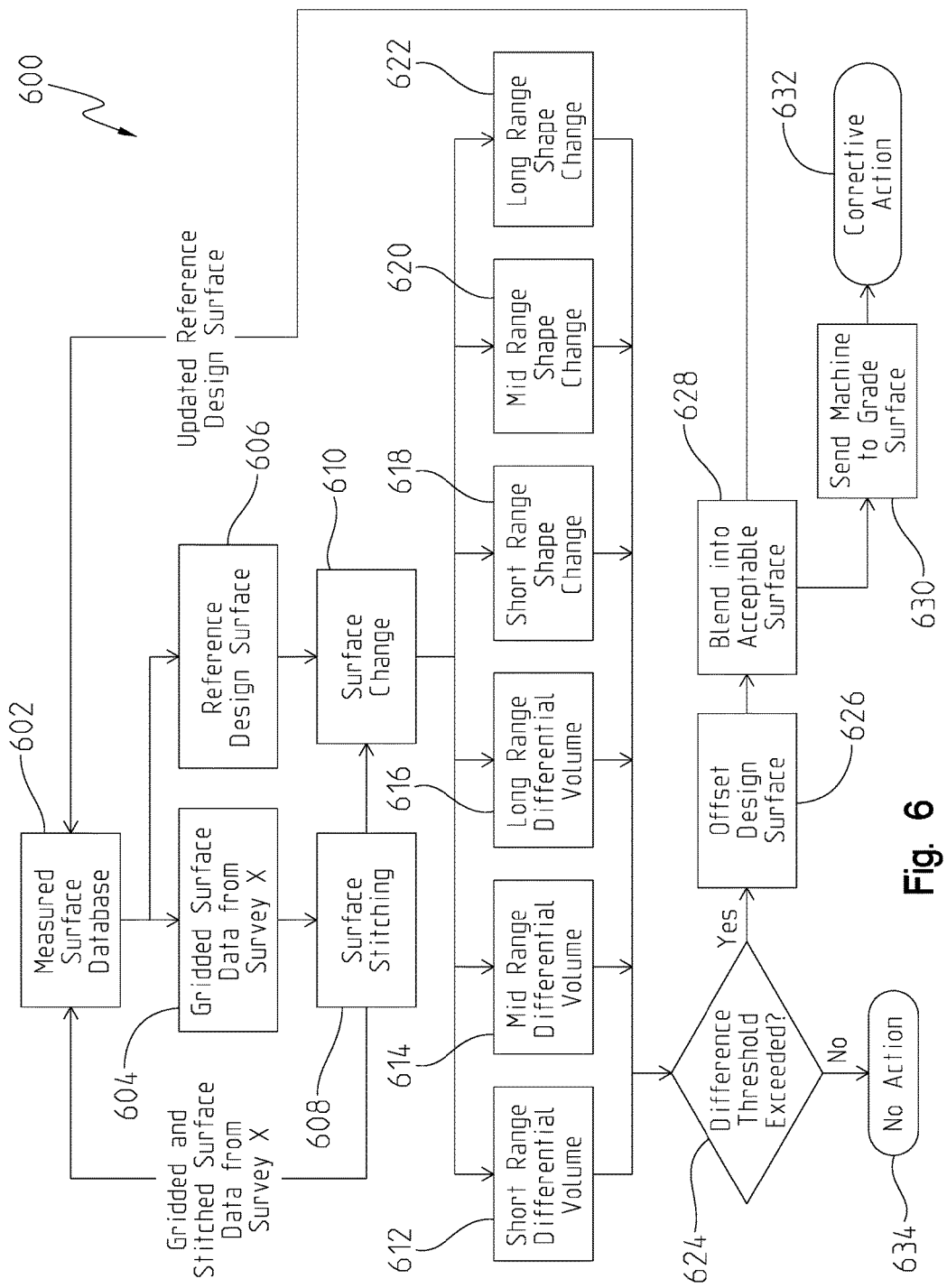
FIG. 6 is a flow diagram of an embodiment of a method of surface comparison using a site scanning system.

A further example of this is shown in FIG. 6 which shows a control process capable of triggering repairs automatically when surfaces are sufficiently different (rather than simply setting a flag for a repair). In this control process 600, a plurality of blocks or steps may be performed. Several of these blocks or steps may be similar to those in the control process 500 of FIG. 5. For example, a first block 602 includes obtaining surface information from a measured surface database 602, which includes a first set of data from survey X in block 604 and a reference set of data for a design surface in block 606. The reference set of data may be for an ideal surface quality.

A surface stitching process may be carried out in block 608 and stored in the database. Moreover, a controller, server, database, or other control means may compare the data of survey X after the stitching process to execute a surface change comparison in block 610. The surface change comparison 610 may be similar to the surface change block 508 in FIG. 5. For each grid point in space, the surface data of survey X is compared to determine a height change or difference between the survey X data and the reference data.

The comparison block or step passes through one or more logical tests to determine whether the surfaces are sufficiently different that some form of corrective action needs to be performed. One set of logical tests integrates the volume between the surfaces. This is shown in blocks 612, 614, and 616. These logical tests may be used for instances where the entire surface is expected to move in space as one unit as it wears. For example, this may be the case due to compaction on a uniformly traversed surface or when a grader or crawler has graded a surface and removed a desired depth of material. In the illustrated embodiment of FIG. 6, a short range differential volume test is performed in block 612, a mid-range differential volume test is performed in block 614, and a large range differential volume test is performed in block 616. Each of these tests may be executed independently or mutually exclusive of one another. Alternatively, each of these tests may be executed together. The difference between the tests may be the size of the sub-set of the surface that was scanned by the machine and amount of data collected and stored in the database for a given survey. For example, if 100 feet of a road surface is scanned and it is found that the middle 90 feet of the surface is 5 mm low compared to the end points, this may trigger a repair in accordance with the previously described embodiment. On the other hand, if a 1-mile stretch of a road surface is scanned and it is found that the middle 4000 feet is 5 mm low, this may not trigger a repair. The thresholds may be set accordingly.

A second test or set of tests is shown in blocks 618, 620, and 622. In these blocks, logical tests are executed to compare the change in shape of the scanned surface. This may be useful when looking at potholes, cracks due to roots or expansion of concrete, tire ruts in dirt roads, or other similar instances. Here, the defect or change in shape is formed in a smaller area of the road or surveyed surface, unlike the change in the entire surface which was described above. Similar to the previous logical tests which detected change in volume, the change in shape logical tests of blocks 618, 620, and 622 may be performed over large areas and distances or small areas and distances.

In each of blocks 612-622, a threshold value may be predefined for each given logical test. For instance, the threshold value stored in block 612 may be different from the threshold value stored in block 614 based on the size of area or distance of the surveyed data. The same may be true of the other blocks 616, 618, 620, and 622. In any event, the surface change data collected in block 610 may be compared to the appropriate differential volume threshold in block 612, 614, or 616, or to the appropriate shape change threshold in block 618, 620, or 622. If the surface change does not exceed the threshold as determined in block 624, then the control process 600 advances to block 634 and no action is taken.

On the other hand, if the surface change does exceed the threshold in block 624, repairs may be automatically triggered. In this embodiment, a difference in surfaces triggers an automated subroutine in block 626. This subroutine or algorithm isolates the area where the surfaces are different, offsets a desired surface vertically in space to create a new nominal repaired surface location, and then smoothes the edges of the nominal repaired surface to join it to the existing surface that does not need to be repaired in block 628. In other words, this subroutine or algorithm is capable of detecting which portion of a surface is acceptable and which portion needs repair, and is then able to begin corrective action.

The corrected design file may be sent to a work machine, e.g., a motor grader or a crawler, and the operator is flagged to drive the route so that the machine is able to fix the surface in accordance with the corrected design file. Any repair executed by the work machine is done so via block 632 as part of a corrective action taken to repair the surface. Alternatively, the corrective action in block 632 may be to trigger an event on a work schedule to repair the surface instead of sending out the repair instructions directly to the work machine and operator. In a further embodiment, with a grade control machine, the operator may be sent a location of the road or surface that needs repair, the operator drives the machine to the road and the machine automatically performs the repair.

Figure 7:
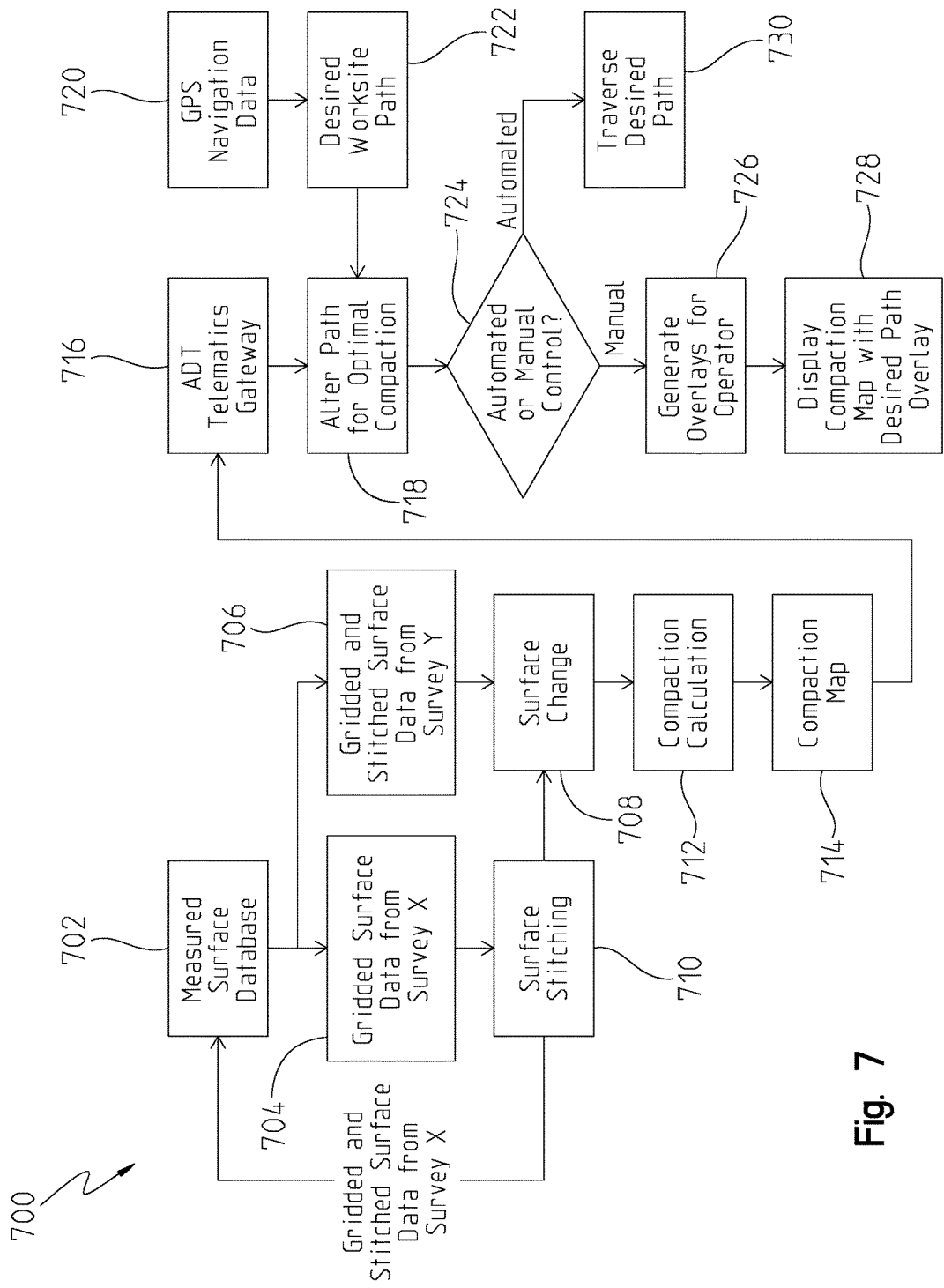
FIG. 7 is a flow diagram of another embodiment of a method of surface comparison.

Another variation of a surface comparison control process is shown in FIG. 7. In this embodiment, the control process 700 includes a plurality of blocks or steps that may be executed in order to maintain a consistent compaction across a building site, for example. Several of the blocks or steps are similar to those in FIGS. 5 and 6. For instance, survey data may be obtained from a measured surface database in block 702 including a first survey run X in block 704 and a second survey run Y in block 706. The two survey runs may have been separate but consecutively executed survey runs. In blocks 704 and 706, gridded surface data is obtained for both scanning runs. In one example, the surface data of survey Y may be reference data. This data may also be gridded and stitched surface data of a reference survey run or an actual survey run.

In block 710, the gridded surface data from survey X may undergo a surface stitching process in block 710, and gridded and stitched surface data from survey X may be stored in the measured surface database. The surface stitching process in block 710 may be any known or conventional process. Alternatively, the process may be tailored for a given surface or infrastructure being scanned. For example, image or photo stitching is referred to as the process of combining two or more images with overlapping fields of view to produce a segmented image. Software and stitching algorithms may be used to perform the stitching process. For instance, this may be an algorithm that is predefined and executed by a controller, server, database controller, or any other control means. In some instances, the algorithm may execute an averaging of gridded points that overlap between two sets of stereo data. Alternatively, it may identify landmarks and overlap the data to match how successive sets of stereo data correspond to a continuous surface.

In block 708, a surface change process may be executed to determine a difference between the two sets of data, or alternatively the survey X surface data compared to the reference data. In any event, the measured surfaces are compared to one another and passed through a separate algorithm in block 712 to calculation compaction. Compaction may be defined as the difference between the designed surface that was originally built or constructed and the current surface following use (i.e., after being driven on by heavy equipment, machines, and other traffic). A server or other control means may calculate a compaction map in block 714 for the job site and transmits the map to one or more machines or service station located on site. In block 716, for example, the compaction map may be sent to an ADT telematics gateway. In combination with the compaction map, GPS navigation data in block 720 along with a desired worksite path 722 may be transmitted. The map with the navigational data may include an altered path to achieve optimal compaction through the job site in block 718. This altered path may achieve to compact areas of lesser compaction or avoid traversing areas with higher compaction.

In block 724, if the machine to perform the compaction is automatically driven (e.g., without or with little input from an operator), the machine may automatically traverse the desired path in block 730 and perform the desired compaction process. Alternatively, if the machine is manually driven, a compaction map and desired path of travel may be displayed in block 726 to the operator on a display located in the cab of the machine (e.g., an ADT haul truck). The desired path may be overlaid on top of the compaction map in block 728.

The aforementioned compaction process may be performed with a haul truck or other construction work machine capable of performing a compaction operation. Other heavy-duty or industrial-type of machines may also be capable of being used to perform the same process. One or more cameras may be coupled to these machines in order to perform one or more the processes described in the present disclosure.

In a further embodiment, it may be possible to use a drone or other device with a camera coupled thereto for taking the images for purposes of compaction measurement and command or surface regeneration. The images may be electrically communicated to a server or database, and when a defect is detected a work machine such as a motor grader may be employed to fix the defect.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A work machine for traversing a surface to detect defects therein, comprising:
   a chassis;
   a plurality of ground-engaging mechanisms coupled to and supporting the chassis;
   a controller for controlling the machine;
   a plurality of sensors coupled to the chassis, the plurality of sensors comprising at least an inertial measurement unit (IMU) and a global positioning sensor electrically coupled to the controller;
   a camera coupled to the chassis and oriented in a direction substantially perpendicular to the surface, the camera configured to take a plurality of images of the surface as the machine travels there along;
   a database disposed in electrical communication with the controller, the database configured to receive images and data associated with each image;
   wherein, as the work machine travels along the surface, the camera takes a first image and a second image, and the controller receives a first set of data when the first image is taken and a second set of data when the second image is taken, where each set of data includes a location, velocity, and orientation of the machine;
   wherein, the IMU is configured to determine a confidence level associated with the first image and transmit the confidence level to the controller;
   further wherein, the first image, the first set of data, the second image, and the second set of data are transmitted to the database for detecting a defect in the surface.

2. The work machine of claim 1, further comprising at least a second camera coupled to the chassis and oriented substantially perpendicular to the surface, the cameras spaced from one another by a predefined distance.

3. The work machine of claim 1, wherein the controller operably links the first image with the first set of data and the surface roughness at the first location, and operably links the second image with the second set of data and the surface roughness at the second location.

4. The work machine of claim 1, further comprising at least one light source coupled to the chassis and oriented to project light on the surface where the camera takes the plurality of images.

5. A method of detecting a defect in a surface of an infrastructure, comprising:
   providing a work machine having a controller, a plurality of sensors including an inertial measurement unit (IMU) and a global positioning sensor (GPS), and a camera oriented in a direction substantially perpendicular to the surface;
   providing a database disposed in electrical communication with the controller;
   taking a first image with the camera of the surface at a first location;
   collecting information with the IMU and the GPS at the first location, the information including at least a position, velocity, and an orientation of the work machine;
   linking the first image with the information collected at the first location;
   storing the first image and the information collected at the first location in the database;
   controlling the work machine to a second location of the surface;
   taking a second image of the surface with the camera at the second location;
   collecting information with the IMU and the GPS at the second location, the information including at least a position, velocity, and an orientation of the work machine;
   linking the second image with the information collected at the second location; and
   storing the second image and the information collected at the second location in the database;
   determining gridded and stitched surface data from the first location and the second location of the surface;
   determining if there is a surface change between each grid point formed in the two sets of data; and
   performing a corrective action if the surface change is indicative of a defect in the surface.

6. The method of claim 5, further comprising measuring a surface roughness of the surface with the IMU at the first location.

7. The method of claim 6, further comprising:
   determining if there is overlap between the first image and the second image;
   rejecting the second image if there is no overlap; and
   generating a disparity map between the first image and the second image if there is overlap.

8. The method of claim 7, further comprising:
   producing point cloud data based on the disparity map;
   projecting the point cloud data onto a surface grid formed from baseline data associated with a non-defective surface;
   determining a difference between the point cloud data and the surface grid; and
   detecting a defect in the surface based on the difference.

9. The method of claim 5, further comprising determining with the IMU a confidence level associated with the first image and transmitting the confidence level to the controller.

10. The method of claim 9, further comprising rejecting the image if the confidence level is below a threshold value.

11. The method of claim 10, further comprising controlling the work machine to return to the first location and taking another image to replace the first image after the rejecting step.

12. The method of claim 5, wherein the determining if there is a surface change step comprises performing a logical test based on a differential volume or shape change.

13. The method of claim 12, further comprising:
comparing the surface change to a threshold; and
transmitting an alert indicative of a defect in the surface requiring repair.

14. The method of claim 13, wherein the comparing step comprises:
comparing the surface change to a first threshold to detect if a difference therebetween requires corrective action; and
comparing the difference to a second threshold to determine the type of corrective action required to repair the defect.

15. The method of claim 5, wherein the performing step comprises:
producing a corrected design file for repairing a defect in the surface; and
transmitting the corrected design file to a third party for scheduling the repair or performing the repair upon receipt.

16. A method for producing a path of travel of a work machine for maintaining compaction of a work surface, comprising:
providing a work machine having a controller, a plurality of sensors including an inertial measurement unit (IMU) and a global positioning sensor (GPS), and a camera oriented in a direction substantially perpendicular to the surface;
providing a database disposed in electrical communication with the controller;
taking a first image with the camera of the surface at a first location and a second image of the surface at a second location;
collecting a first set of data with the IMU and the GPS at the first location and a second set of data at the second location, each set of data including at least a position, velocity, and an orientation of the work machine;
linking the first image with the information collected at the first location and the second image with the information collected at the second location;
storing the first image and the information collected at the first location in the database;
generating a disparity map from the first image, the second image, and the information collected at the first and second locations;
producing a first gridded and stitched surface data based on the first image and the first set of data, and a second gridded and stitched surface data based on the second image and the second set of data;
calculating compaction between the surface at the first location and the surface at the second location; and
producing a path of travel to achieve desired compaction of the surface at and between the first and second locations.

17. The method of claim 16, further comprising producing a compaction map based on a result of the calculating compaction step.

18. The method of claim 17, further comprising:
generating an overlay of the surface with the path of travel;
communicating the compaction map to a second work machine capable of performing the desired compaction; and
displaying the compaction map with the path of travel on a display screen in a cab of the second work machine.

* * * * *